United States Patent [19]
Dent et al.

[11] Patent Number: 5,896,498
[45] Date of Patent: Apr. 20, 1999

[54] METHOD AND APPARATUS FOR PROTECTING USER PRIVACY BY PROVIDING AN INACCURATE MEASURE OF NETWORK SYSTEMS ACCESSSED

[75] Inventors: David E. Dent, Portland; Vaughn S. Iverson, Beaverton; John W. Richardson, Portland; Robert T. Adams, Lake Oswego; Jeffrey N. Kidder, Hillsboro, all of Oreg.; Chihuan M. Lin, Chandler, Ariz.; Thomas R. Gardos, Portland, Oreg.

[73] Assignee: Intel Corporation, Santa Clara, Calif.

[21] Appl. No.: 08/770,669

[22] Filed: Dec. 20, 1996

[51] Int. Cl.[6] .................................................. H04L 9/00
[52] U.S. Cl. ............................................... 395/187.01
[58] Field of Search ............................. 395/186, 187.01, 395/188.01

[56] References Cited

U.S. PATENT DOCUMENTS

| 5,655,077 | 8/1997 | Jones et al. | 395/187.01 |
| 5,684,951 | 11/1997 | Goldman et al. | 395/188.01 |
| 5,708,780 | 1/1998 | Levergood et al. | 395/200.12 |

*Primary Examiner*—Dung C. Dinh
*Assistant Examiner*—William Titcomb
*Attorney, Agent, or Firm*—Blakely, Sokoloff, Taylor & Zafman LLP

[57] ABSTRACT

A method and apparatus for protecting user privacy by providing an inaccurate measure of network systems automatically initiates one or more non-user requested accesses to one or more network systems. The data received from the host system corresponding to the one or more non-user requested accesses is then automatically ignored.

17 Claims, 6 Drawing Sheets

METHOD AND APPARATUS FOR PROTECTING USER PRIVACY BY PROVIDING AN INACCURATE MEASURE OF NETWORK SYSTEMS ACCESSSED

BACKGROUND OF THE INVENTION

1. Field of the Invention

The present invention pertains to the field of networks. More particularly, this invention relates to protecting user privacy on a network.

2. Background

As computer technology has advanced the use of networks has continually increased. Broadly, a network refers to a system which can couple together two or more computer systems such that the systems can communicate with one another. One characteristic of a network is the fact that, in order for two computer systems to communicate with one another, each needs to be able to identify the other. Typically, each computer system has an address associated with itself and computer systems in the network can identify one another via these addresses.

However, one problem which is present when accessing other computer systems via a network is privacy. Typically it is not possible for a computer system to request information from another computer system via the network without divulging an identifier, such as the address, of the requesting computer, and thereby also divulging the identity of the user. Yet, there are situations where individuals prefer to have their access to other computer systems via a network remain private.

One example of this situation is a user's access from a client computer system to a host computer system via the Internet. The host system is able to maintain a record of the Internet addresses of all other computer systems which have accessed the host, including the client system. Another example is a device which is coupled to the Internet and configured to monitor all traffic which passes by it on the Internet. This device could be, for example, a router or gateway which assists in the transferring of packets to various locations on the Internet. This device could access all packets that are routed through it and maintain a record of the source and target Internet addresses of each packet.

Thus, it would be beneficial to provide a system which prevents a host system or other device monitoring accesses in a network from accurately identifying which computer systems have accessed which other computer systems.

As will be described in more detail below, the present invention provides a method and apparatus for protecting user privacy by providing an inaccurate measure of network systems accessed which achieves these and other desired results which will be apparent to those skilled in the art from the description that follows.

SUMMARY OF THE INVENTION

A method and apparatus for protecting user privacy by providing an inaccurate measure of network systems accessed is described herein. One or more non-user requested accesses to one or more network systems are first initiated. The data received from the host system corresponding to the one or more non-user requested accesses is then automatically ignored.

According to one embodiment of the present invention, multiple network system identifiers are generated, one after another. Soon after the identified network system is accessed, the access to the identified system is canceled and the next identified system is accessed.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
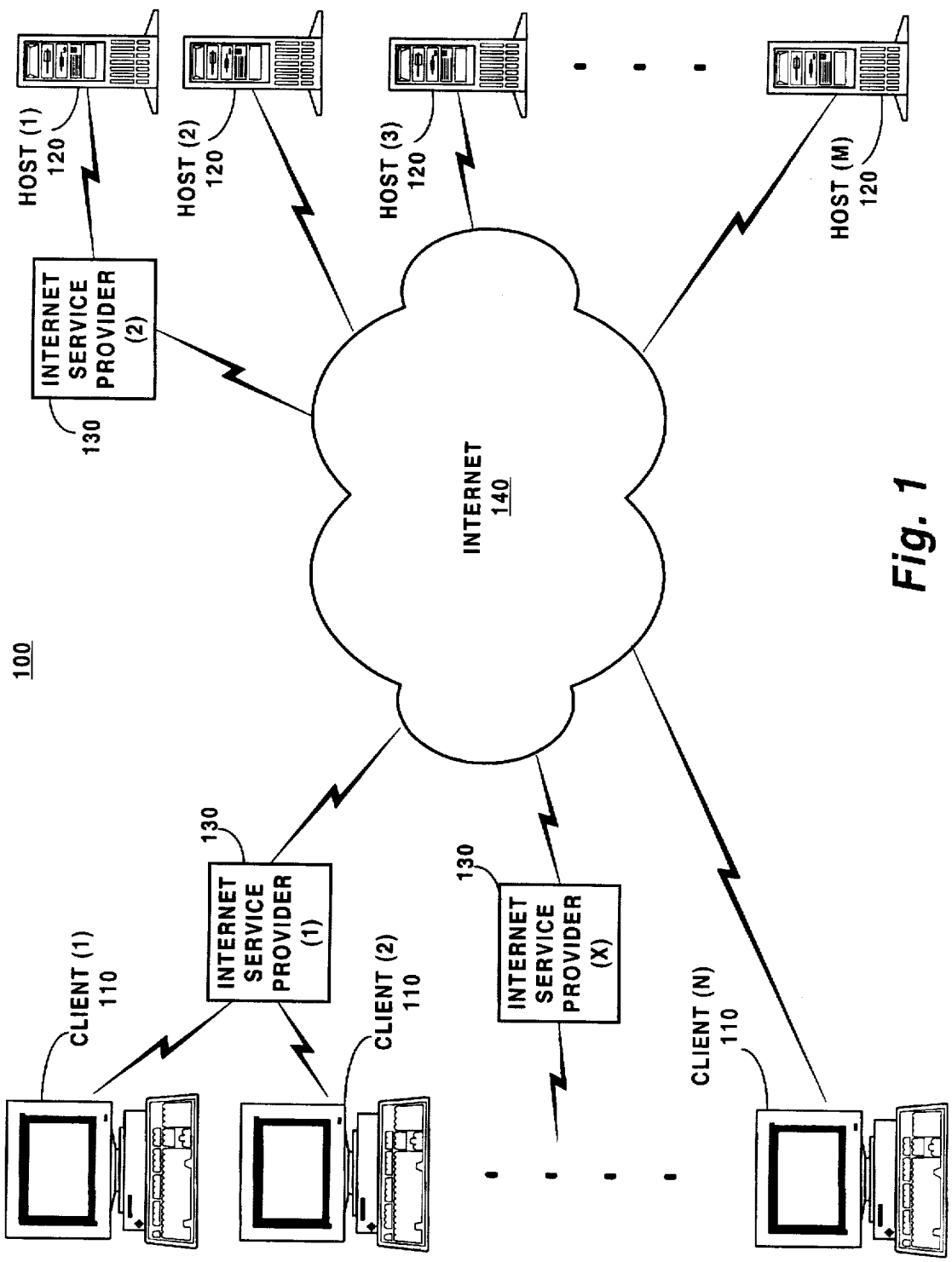
FIG. 1 is a block diagram illustrating a network environment in which the present invention may be practiced.

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the discussions to follow, reference is made to both "genuine accesses" and "deceptive accesses". A genuine access refers to a user requested access to a host system. In other words, a host system being accessed at the specific request of a user. A deceptive access refers to a non-user requested access to a host system. In other words, a host system being accessed where the access is not specifically requested by a user.

The present invention provides protection of user privacy on a network by providing an inaccurate measure of network systems accessed by the user. The present invention automatically initiates access to a host system on the network and then automatically ignores the data received from the host system. Thus, the user's privacy is protected because the host system, as well as any other device or system monitoring accesses via the network, will not know whether the access to the host system is a genuine access or merely a deceptive access.

FIG. 1 is a block diagram illustrating a network environment in which the present invention may be practiced. As illustrated, network environment 100 includes multiple (N) client systems 110 and multiple (M) host systems 120, collectively referred to as network systems. Network environment 100 also includes multiple (X) internet service providers (ISPs) 130 and the Internet 140. Each client system 110 can be any of a wide range of computing devices which provide a user with the ability to access the internet 140.

Each ISP 130 is typically a computer system having multiple communication lines for accessing both the client systems 110 and the Internet 140 and optionally having a large amount of storage space (typically on the order of hundreds of gigabytes or terabytes). Additionally, some ISPs 130 also cache data received from host systems 120. The data that is cached may be the result of an access initiated by a user of a client system 110, or may be the result of a self-initiated access by the ISP 130. If a request for access to a host system 120 is received by an ISP 130 and the ISP 130 has the requested data from the host system stored in its cache, then the ISP returns the requested data to the client system rather than forwarding the request to the targeted host system.

Each host system 120 is also typically a computer system which can be accessed by the client systems 110. According to one embodiment, each host system 120 includes one or more HyperText Markup Language (HTML) compatible web pages which can be accessed via the HyperText Transfer Protocol (HTTP) and displayed by an HTML compatible Internet browser running on a client system 110.

The Internet 140 is a combination of multiple conventional hardware components, including computer systems, routers, repeaters, gateways, and communications links spread throughout the world. These hardware components are organized hierarchically to provide multiple logical levels of networks. The hardware components of Internet 140 interact to route data from one computer system to another. According to one implementation, data is transferred between computer systems using the well-known Transmission Control Protocol/Internet Protocol (TCP/IP) protocol. The data is typically transferred in units referred to as "packets" or "datagrams". Typically, each packet includes data, a source address identifying the system which initiated the packet and a target address identifying the system to which the packet is to be sent. Additional control information, such as a checksum, may also be included in the packet. The number of bytes of data contained within a packet is dependent on the network protocol being used.

The communication links illustrated in FIG. 1 may be any of a wide range of conventional communication media, and may be different for different systems 110, host systems 120, and ISPs 130. For example, a communication link may be a cable, a fiber-optic cable, or may represent a nonphysical medium transmitting electromagnetic signals in the electromagnetic spectrum. Additionally, a communication link may also include any number of conventional routing or repeating devices, such as satellites or electromagnetic signal repeaters.

It is to be appreciated that although the client systems 110 and host systems 120 are illustrated as being different machines, a single hardware system may be both a client system and a host system. If the hardware system is initiating an access for information to another system then the hardware system is referred to as a client system. However, if the hardware system is being accessed by another system to obtain information from the hardware system then the hardware system is referred to as a host system.

It is to be appreciated that additional networks may also be included in the network environment 100. For example, multiple client systems 110 may be coupled together in an Ethernet, token ring, or other conventional network and access an ISP 130 through this additional network.

Figure 2:
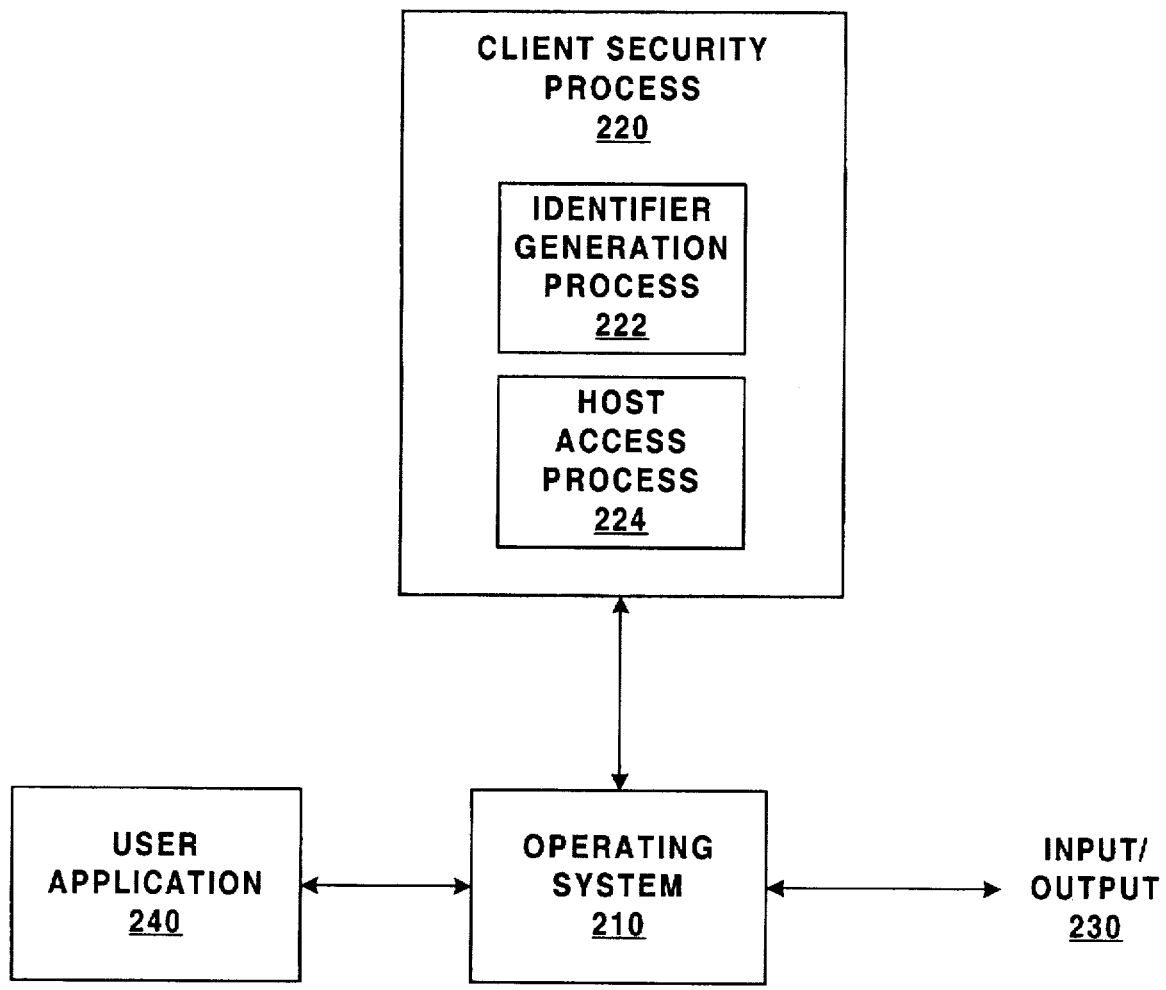
FIG. 2 is a simplified block diagram illustrating a system architecture such as may be used with one embodiment of the present invention.

FIG. 2 is a simplified block diagram illustrating a system architecture such as may be used with one embodiment of the present invention. As shown, the system architecture includes an operating system 210 and a client security process 220. A user application 240 may also optionally be included. According to one embodiment of the present invention, the client security process 220 and operating system 210 are executing on one or more of the client systems 110 of FIG. 1.

Operating system 210 manages and controls the operation of client system 110, including the input and output of data to and from client security process 220 as well as other software applications (not shown). This data may be received from and transferred to any of the systems coupled to the client system 110 as input/output 230. Operating system 210 provides an interface, such as a graphical user interface (GUI), between the user and the software applications being executed on the system. According to one embodiment of the present invention, operating system 210 is the Windows™ 95 operating system, available from Microsoft Corporation of Redmond, Wash. However, it is to be appreciated that the present invention may be used with any other conventional operating system, such as other versions of Microsoft Windows™ (for example, Windows™ 3.0, Windows™ 3. 1, or Windows™ NT), Microsoft DOS, OS/2, available from International Business Machines Corporation of Armonk, N.Y., the Apple Macintosh Operating System, available from Apple Computer Incorporated of Cupertino, Calif., or the UNIX operating system, available from Santa Cruz Operations of Santa Cruz, Calif.

User application 240 is a software application which can be run by the user of client system 100. In the illustrated embodiment, user application 240 provides an individual user with access to Internet 140. In one implementation, user application 240 is one of any of a wide variety of commercially available Internet web browsers, such as Navigator™, available from Netscape Communications of Mountain View, Calif.

Client security process 220 includes an identifier generation process 222 and a host access process 224. Identifier generation process 222 automatically generates a network identifier of a host system 120 which will be accessed by host access process 224. In one embodiment, this identifier is a network address. However, it is to be appreciated that other identifiers may also be used, such as a Uniform Resource Locator (URL). The generation of an identifier and accesses to hosts is discussed in more detail below.

Figure 3:
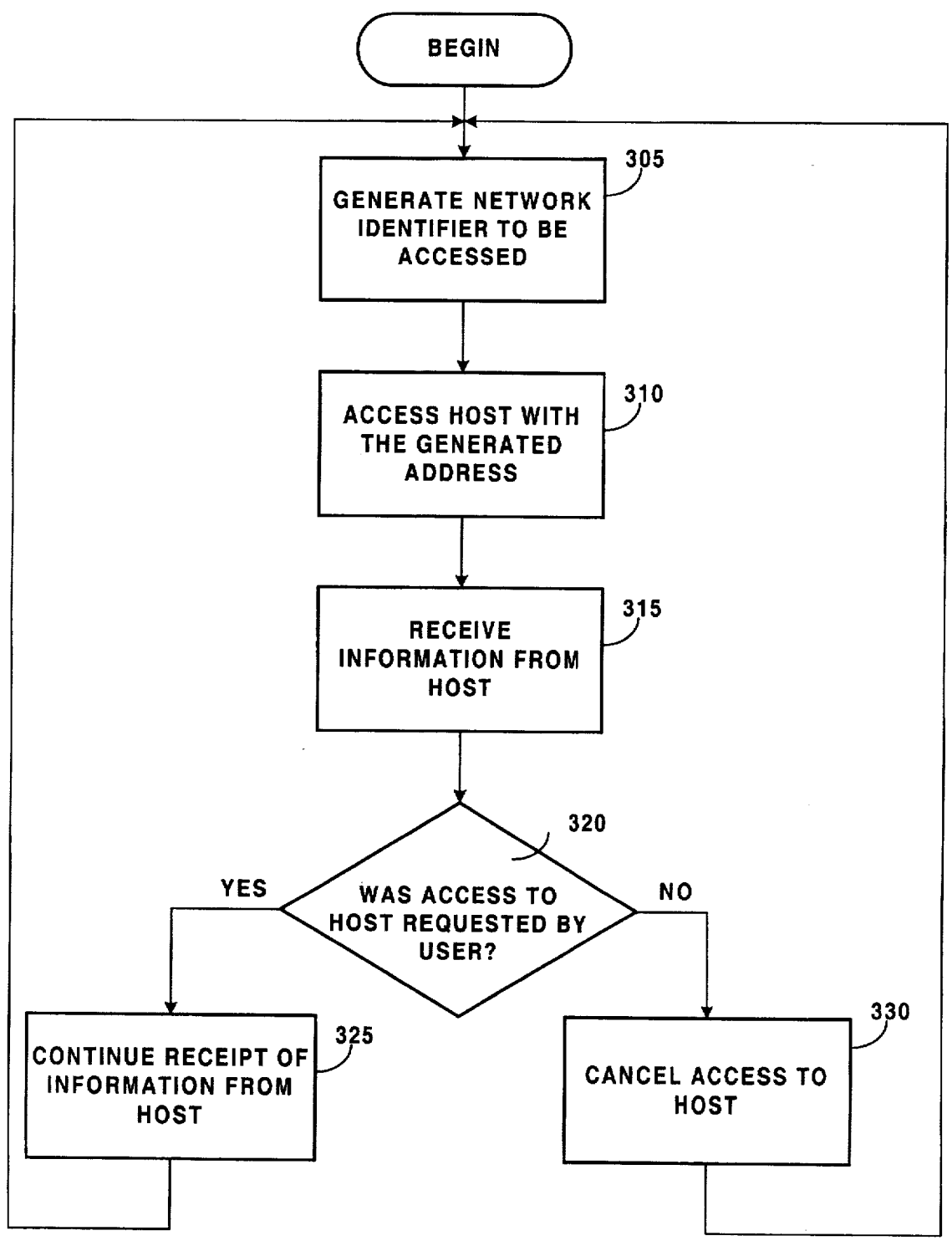
FIG. 3 is a flowchart illustrating the steps taken to protect the identity of the source of a request according to one embodiment of the present invention.

FIG. 3 is a flowchart illustrating the steps taken to provide an inaccurate measure of network systems accessed according to one embodiment of the present invention. As illustrated, identifier generation process 222 generates a network identifier to be deceptively accessed, step 305. Host access process 224 then accesses the host system on the network identified by the generated identifier, step 310. In response to the client's access to the host, host access process 224 of the client system begins to receive information from the host, step 315. Host access process 224, upon receiving information from the host, checks whether access to the host was requested by the user of the client system, step 320. If access to the host was requested by the user, then host access process 224 continues to receive information from the host and forwards the data to the user, step 325. However, if access to the host was not requested by the user, then host access process 224 cancels access to the host, step 330.

According to an alternate embodiment of the present invention, such as when the client security process is run and the client system is not already engaged in an Internet session in response to a user request, checking step 320 is not included. Thus, in this alternate embodiment host access process 224 cancels access to the host, step 330, as soon as information is received from the host, step 315.

The deceptive accessing of host systems illustrated in FIG. 3 can be done by client security process 220 using any of a wide range of timings. According to one embodiment of the present invention, client security process 220 generates a network system identifier and deceptively accesses the identified network system immediately after a user of the client system requests and receives information from another network system (that is, after completing a genuine access). In this embodiment, client security process 220 does not access another network system until after the user has requested and received information from another network system. In alternate embodiments, client security process 220 accesses networks at periodic intervals (e.g., every fifteen seconds, five minutes, or half-hour). In another alternate embodiment, client security process 220 access networks continually, generating another identifier and accessing the corresponding host as soon as the access to the previous host is canceled.

It is to be appreciated that client security process 220 can be implemented in any of a variety of devices coupled to a network. According to one embodiment of the present invention, client security process 220 is implemented in the client systems 10 of FIG. 1. In this embodiment, client security process 220 sends requests from the user which is currently logged into the client system to the host identified in step 305.

In an alternate embodiment, client security process 220 is implemented in the ISPs 130. Typically, individuals pay an ISP 130 for access to the Internet, which establishes an account for the individual at the ISP 130. In this alternate embodiment identifier generation process 222 can generate identifiers to be deceptively accessed on behalf of any one or more of the individuals holding accounts with the ISP. Thus, since an ISP 130 has access to that individual's address, the ISP can initiate deceptive accesses to hosts identified in the generating step 305 of FIG. 3 listing the individual's address as the source address, even though that individual may not be logged into a client system at the time.

In another alternate embodiment, client security process 220 is implemented on a separate security system coupled to Internet 140. In one implementation, this security system is a host system 120 of FIG. 1. In this alternate embodiment, individuals can register themselves with the security system which in turn initiates deceptive accesses to hosts identified in the generating step 305 of FIG. 3 listing the registered individual's address as the source address.

Referring again to FIG. 3, the step of generating a network identifier to be accessed, step 305, can be implemented in any of a wide range of manners. According to one embodiment of the present invention, information is passed between client systems 110 and host systems 120 of FIG. 1 using the Internet Protocol (IP). The Internet Protocol includes a four-number source address and a four-number target address, with the numbers in the address being separated by periods. For example, two such addresses would be 34.252.72.8 and 143.5.1.99.

According to one implementation, identifier generation process 222 generates, in step 305, an IP address as the identifier. This IP address can be generated in any of a wide range of manners, such as using a random number generator, selecting addresses from a predetermined list of addresses (e.g., a list provided by the user, or the updating or maintaining of a proxy database of frequently accessed material), or by indexing any one or more of the four numbers in the address (e.g., each new address is generated by incrementing the previously generated address by a particular value, such as four).

Figure 4:
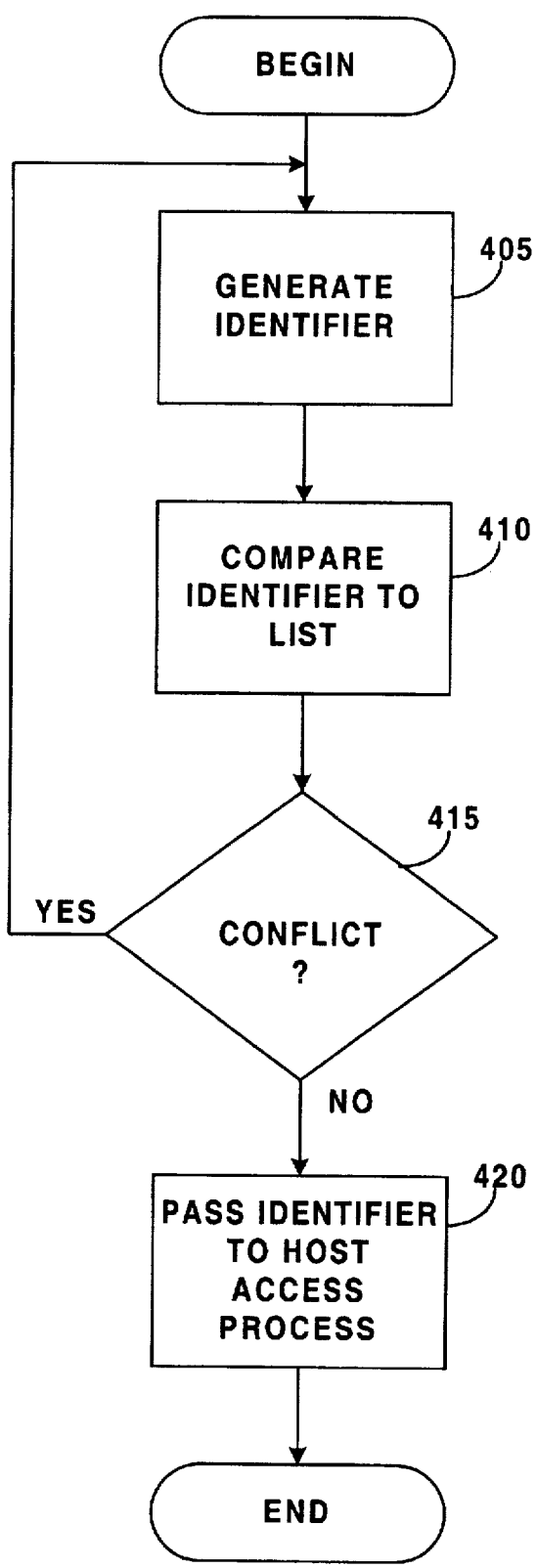
FIG. 4 is a flowchart illustrating the steps taken to provide such additional checks according to one embodiment of the present invention.

In another implementation of the present invention, identifier generation process 222 generates, in step 305, an URL as the identifier. This URL can be generated in any of a wide range of manners, such as by selecting an URL from a list of valid URLs maintained by identifier generation process 222. This list of valid URLs could be updated and maintained in any of a wide variety of conventional manners, such as by obtaining a copy of known URLs from a "web walker", such as AltaVista™, which can be accessed via the world wide web at "http:H/www.alta-vista.com/". is It is to be appreciated that additional checks and qualifications can be added to identifier generation process 222. FIG. 4 is a flowchart illustrating the steps taken to provide such additional checks according to one embodiment of the present invention. In the illustrated embodiment, FIG. 4 illustrates step 305 of FIG. 3 in more detail. A network identifier is first generated, step 405. The network identifier can be generated in any of a wide variety of manners, as discussed above. Identifier generation process 222 compares the generated identifier to a list of identifiers, step 410, and checks whether there is a conflict between the generated identifier and the list, step 415. If there is a conflict, then identifier generation process 222 returns to step 405 to generate another identifier. However, if there is not a conflict, then identifier generation process 222 passes the identifier generated in step 405 to host access process 224, step 420.

It is to be appreciated that a conflict, as checked for in step 415, can be identified in any of a wide range of conventional manners. According to one implementation, identifier generation process 222 retrieves a list of network identifiers which are not to be used by client security process 220. An identifier generated in step 405 which is in this list conflicts with the list. For example, if a user has certain hosts which he or she never wants to access and never wants any other monitoring device to indicate that he or she has accessed, then the identifiers of these hosts can be added to the list (e.g., by the user). Then, if identifier generation process 222 generates an identifier corresponding to one of these hosts, a conflict is identified, resulting in identifier generation process 222 ignoring the identifier and generating a new identifier.

According to another implementation, identifier generation process 222 maintains a list of words or phrases. If the host corresponding to the identifier generated in step 405 contains any of the words or phrases (or alternatively, does not contain any of the words or phrases), then the identifier generated in step 405 conflicts with the list. Various host systems 120 and possibly ISPs 130 include search engines which enable an individual to search for particular host systems 120 which include data of interest. These search engines often contain a list of words, such as key words or an abstract, which identify the information available from the host systems 120 via Internet 140. If client security process 220 is executing on a host system 120 or ISP 130 which includes such a search engine, then identifier generation process 222 compares the key words for the identified host to this list of words and verifies that the host system identified in step 405 does not contain any phrases or words identified by the user. Alternatively, a client system 10 could copy the key word information from a host system 120 or a search engine and then use this copied list to identify conflicts. If identifier generation process 222 generates an identifier corresponding to a host which has key words which are contained in the list, then a conflict is identified.

Figure 5:
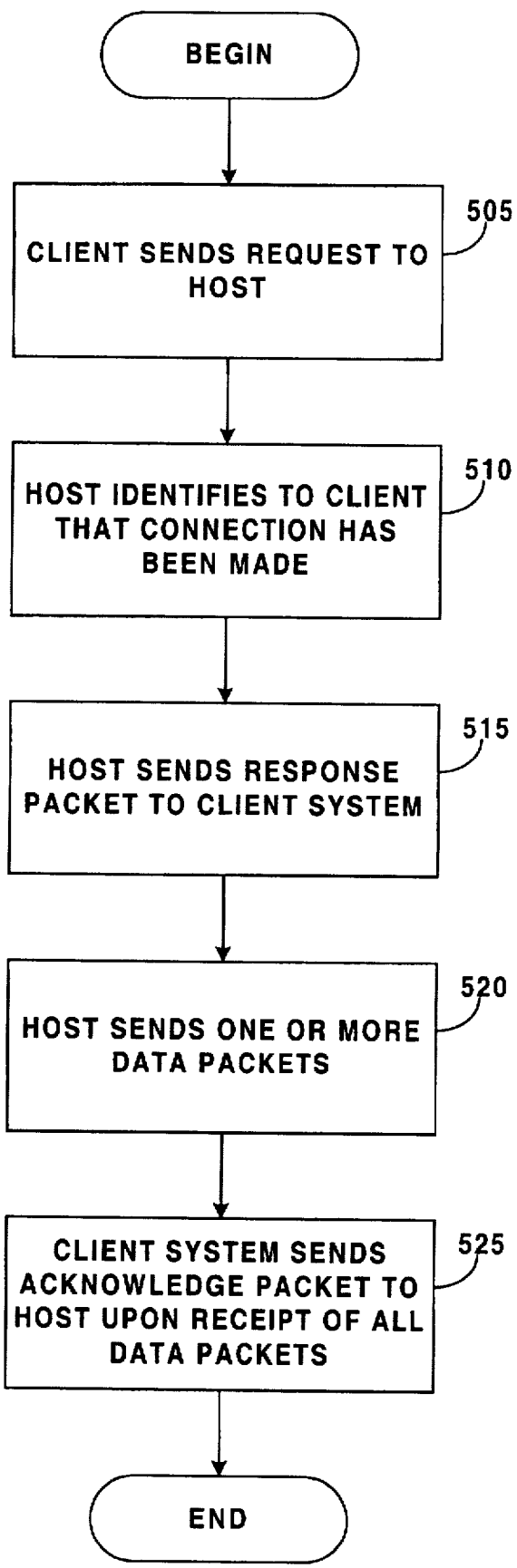
FIG. 5 is a flowchart illustrating the steps in transferring information from a host system to a client system according to one embodiment of the present invention.

FIG. 5 is a flowchart illustrating the steps in transferring information from a host system to a client system according to one embodiment of the present invention. In the description of FIG. 5, messages between the client system and host are identified as occurring in packets. However, it is to be appreciated that other network protocols which do not transfer information as packets can also be used within the spirit and scope of the present invention.

The client system initiates the transfer by sending a request for information to the host, step 505. Upon receipt of the request, the host sends an indication to the client system that a connection has been made, step 510. The host then sends a packet to the client system containing a response, step 515. This response is typically an indication that the requested information is available. The host then proceeds to send one or more data packets to the client system, step 520. The number of packets sent in step 520 is dependent on the amount of data which can be stored in a packet, according to the protocol, and the amount of information to be transferred from the host to the client system. Upon receiving all of the data, the client system sends an acknowledge packet to the host, step 525, indicating that all the data has been received.

The amount of information received from the host prior to canceling access to the host, step 330 of FIG. 3, can vary. According to one implementation, the cancellation occurs as soon as the connection identification information has been received in step 510. Alternatively, the cancellation could occur as soon as the response information is received, step 515, or as soon as one or more of the data packets has been received, step 520, or even prior to receiving the connection identification information in step 510.

According to one embodiment of the present invention, access to the host system is canceled by the client system sending a "stop" packet to the host. The stop packet indicates to the host that it is to stop sending packets of data to the client system. In one implementation, the host stops sending packets of data to the client system as soon as it receives the stop packet, regardless of how much data, if any, it has already transferred to the client system.

According to one embodiment of the present invention, any data which is received from the host identified in the generating step 305 of FIG. 3 is ignored by the client system. In this embodiment, client security process 220 discards any data received from that host. Thus, the data is not displayed to the user of the client system.

In an alternate embodiment of the present invention, an ISP 130 intercepts the data received from the host system identified in the generating step 305 of FIG. 3. If client security process 220 is executing on an ISP 130 rather than a client system 110, then ISP 130 ignores any data received from the host system and does not forward the data to client system 110. Alternatively, if client security process 220 is executing on a client system 110, then client system 110 can send a message to ISP 130 indicating that data received from the host identified in the generating step 305 is not to be forwarded to the client system. Thus, in these alternate embodiments, the data from the host identified in the generating step 305 is not displayed to the user of the client system.

Figure 6:
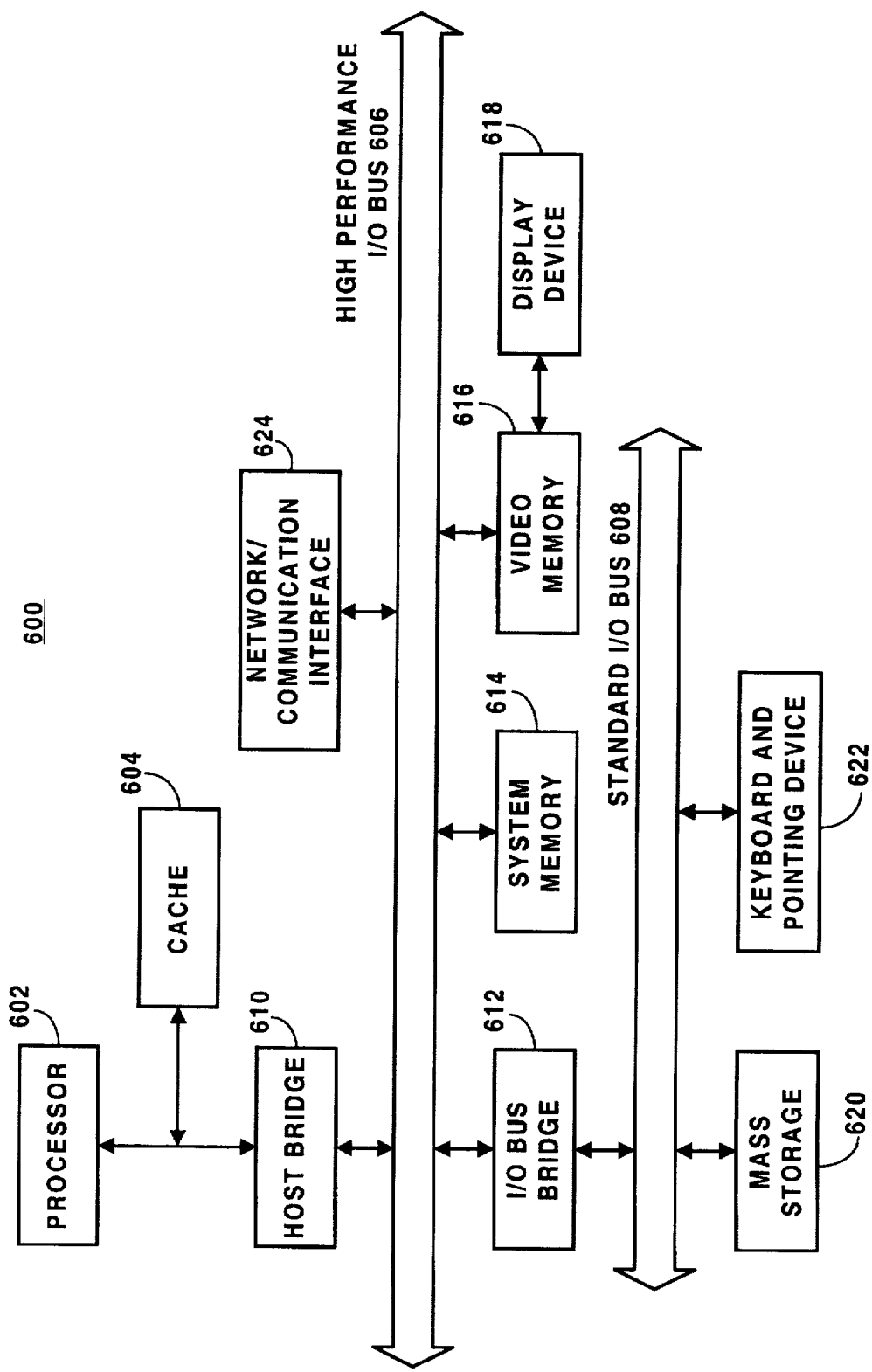
FIG. 6 illustrates one embodiment of a hardware system suitable for use with the present invention.

FIG. 6 illustrates one embodiment of a hardware system suitable for use with the present invention. In one embodiment, each of the client systems 110 and host systems 120 illustrated in FIG. 1 are hardware systems 600 of FIG. 6. In the illustrated embodiment, hardware system 600 includes processor 602 and cache memory 604 coupled to each other as shown. Additionally, hardware system 600 includes high performance input/output (I/O) bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624, system memory 614, and video memory 616. In turn, display device 618 is coupled to video memory 616. Coupled to bus 608 is mass storage 620 and keyboard and pointing device 622.

These elements 602–622 perform their conventional functions known in the art. In particular, network/communication interface 624 is used to provide communication between system 600 and any of a wide range of conventional networks, such as an Ethernet, token ring, the Internet, etc. It is to be appreciated that the circuitry of interface 624 is dependent on the type of network the system 600 is being coupled to.

Mass storage 620 is used to provide permanent storage for the data and programming instructions to implement the above described functions, whereas system memory 614 is used to provide temporary storage for the data and programming instructions when executed by processor 602. Mass storage 620 may be provided with the programming instructions by loading the programming instructions from a distribution storage medium (not shown), or by downloading the programming distributions from a server (not shown) coupled to hardware system 600 via network/communication interface 624. Collectively, these elements are intended to represent a broad category of hardware systems, including but not limited general purpose computer systems based on the Pentium® processor or Pentium® Pro processor, manufactured by Intel Corporation of Santa Clara, Calif.

It is to be appreciated that various components of hardware system 600 may be rearranged. For example, cache 604 may be on-chip with processor 602. Furthermore, certain implementations of the present invention may not require nor include all of the above components. For example, mass storage 620, keyboard and pointing device 622, and/or display device 618 and video memory 616 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, storage devices, or memories.

In one embodiment, the method and apparatus for protecting user privacy discussed above is implemented as a series of software routines run by the hardware system of FIG. 6. These software routines comprise a plurality or series of instructions to be executed by a processor in a hardware system, such as processor 602 of FIG. 6. Initially, the series of instructions are stored on a storage device, such as mass storage 620. The instructions are copied from storage device 620 into memory 614 and then accessed and executed by processor 602. In one implementation, these software routines are written in the C++ programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

In several of the discussions above, the network environment is described as being the Internet. It is to be appreciated, however, that the present invention can be used with any type of network environment and is not limited to the Internet.

Thus, the present invention provides a method and apparatus for protecting user privacy by providing an inaccurate measure of network systems accessed. The present invention provides additional information in the network environment so that any device monitoring individual accesses cannot obtain an accurate measure of whether a user is genuinely accessing a particular system or whether the access is a deceptive access. Thus, the accesses of the individual user(s) are hidden among the multiple accesses made by the method and apparatus of the present invention. Therefore, the deceptive accesses obscure an individual's genuine accesses, thereby preventing any device monitoring an individual's accesses from obtaining a statistically accurate record of that individual's access patterns.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
   automatically initiating at least one non-user requested access to at least one network system; and
   automatically ignoring data received from the at least one network system in response to the at least one non-user requested access.

2. The method of claim 1, further comprising canceling access to a first network system of the at least one network system upon receipt of information from the first network system.

3. The method of claim 1, wherein the automatically initiating comprises:
   automatically generating at least one network system identifier; and
   accessing the at least one network system identified by the at least one network system identifier.

4. The method of claim 1, wherein the network is the Internet.

5. The method of claim 4, wherein the automatically initiating comprises automatically generating a random Internet Protocol (IP) address.

6. A computer-readable medium having stored thereon a plurality of instructions, designed to be executed by a processor, for implementing a function to automatically initiate at least one non-user requested access to at least one network system, and to automatically ignore the data received from the at least one network system in response to the at least one non-user requested access.

7. The computer-readable medium of claim 6, wherein the automatically initiating at least one non-user requested access comprises automatically generating at least one random Internet Protocol (IP) address corresponding to the at least one network system.

8. An apparatus comprising:
   identification initiation logic to automatically initiate at least one non-user requested access to at least one network system; and
   host access logic to automatically ignore data received from the at least one network system.

9. The apparatus of claim 8, wherein the identification initiation logic automatically generates at least one random Internet Protocol (IP) address corresponding to the at least one network system.

10. An apparatus comprising:
    means for automatically initiating at least one non-user requested access to at least one network system; and
    means for automatically ignoring data received from the at least one network system in response to the at least one non-user requested access.

11. The apparatus of claim 10, wherein the means for automatically initiating comprises means for automatically generating at least one random Internet Protocol (IP) address corresponding to the at least one network system.

12. The computer-readable medium of claim 6, the function further to cancel access to a first network system of the at least one network system upon receipt of information from the first network system.

13. The computer-readable medium of claim 6, wherein the automatically initiating at least one non-user requested access comprises automatically generating at least one network system identifier, and accessing the at least one network system identified by the at least one network system identifier.

14. The apparatus of claim 8, further comprising:
    cancellation logic to cancel access to a first network system of the at least one network system upon receipt of information from the first network system.

15. The apparatus of claim 8, wherein the identification initiation logic automatically generates at least one network system identifier, and accesses the at least one network system identified by the at least one network system identifier.

16. The apparatus of claim 10, further comprising:
    means for canceling access to a first network system of the at least one network system upon receipt of information from the first network system.

17. The apparatus of claim 10, wherein the means for automatically initiating comprises means for automatically generating at least one network system identifier, and means for accessing the at least one network system identified by the at least one network system identifier.

* * * * *

UNITED STATES PATENT AND TRADEMARK OFFICE
CERTIFICATE OF CORRECTION

PATENT NO. : 5,896,498
DATED : April 20, 1999
INVENTOR(S) : Dent, et al.

It is certified that error appears in the above-identified patent and that said Letters Patent is hereby corrected as shown below: On the title page:

Item [54] and Col. 1, line 1, delete "accesssed" and insert -- accessed --

In column 5 at line 52 delete "10" and insert -- 110 --

In column 6 at line 39 delete "http:H/www.alta-vista.com/". is". and insert -- http://www.alta-vista.com/ --

In column 7 at line 20 delete "10" and insert -- 110 --

Signed and Sealed this

First Day of February, 2000

Attest:

Attesting Officer

Q. TODD DICKINSON

Acting Commissioner of Patents and Trademarks